US006418433B1

United States Patent
Chakrabarti et al.

(12) United States Patent
(10) Patent No.: US 6,418,433 B1
(45) Date of Patent: Jul. 9, 2002

(54) SYSTEM AND METHOD FOR FOCUSSED WEB CRAWLING

(75) Inventors: Soumen Chakrabarti, San Jose; Byron Edward Dom, Los Gatos; Martin Henk van den Berg, Palo Alto, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/239,921

(22) Filed: Jan. 28, 1999

(51) Int. Cl.[7] .............................................. G06F 17/30
(52) U.S. Cl. ............................ 707/5; 707/513; 709/218
(58) Field of Search .......................... 707/1–6, 10, 104, 707/501, 513; 709/200, 203, 217–219

(56) References Cited

U.S. PATENT DOCUMENTS

| | | | |
|---|---|---|---|
| 5,369,577 A | 11/1994 | Kadashevich et al. | 364/419.13 |
| 5,530,852 A | 6/1996 | Meske, Jr. et al. | 395/600 |
| 5,708,829 A | 1/1998 | Kadashevich et al. | 395/793 |
| 5,717,912 A | 2/1998 | Millett et al. | 395/603 |
| 5,784,608 A | 7/1998 | Meske, Jr. et al. | 395/602 |
| 5,787,417 A | 7/1998 | Hargrove | 707/4 |
| 5,796,952 A * | 8/1998 | Davis et al. | 709/234 |
| 5,832,494 A * | 11/1998 | Egger et al. | 707/102 |

OTHER PUBLICATIONS

"Fab: Content–Based, Collaborative Recommendation," Balabanovic and Shoham, Communications of the ACM, Mar. 1997, vol. 40, No. 3, pp. 66–72.*

"Annotated Reference List Agents," David C. Blight, Proceedings of the 1997 IEEE Conference on Communications, Power and Computing, May 22–23, 1997, pp. 7–12.*

"Silk from a Sow'Ear: Extracting Usable Structures from the Web," Pirolli et al., Xerox PARC, Proceedings of the 1996 Conference on Human Factors and Computing Systems, Canada, Apr. 13, 1996, pp. 118–125 Available at and downloaded from http:/www.acm.*

"Enhanced Hypertext Categorization Using Hyperlinks," Chakrabarti et al., Proceedings of the 1998 ACM SUGMOD International Conference on Management of Data, Seattle, USA, Jun. 1, 1998, pp. 307–318.*

"Automated Reference List Agents," David C. Blight, TRlabs, Winnipeg, Canada, Proceedings of the 1997 IEEE Conference or Communications, Power and Computing, May 22–23, 1997 97CH36117, apges 7–12.*

* cited by examiner

Primary Examiner—Hosain T. Alam
(74) Attorney, Agent, or Firm—John L. Rogitz

(57) ABSTRACT

A focussed Web crawler learns to recognize Web pages that are relevant to the interest of one or more users, from a set of examples provided by the users. It then explores the Web starting from the example set, using the statistics collected from the examples and other analysis on the link graph of the growing crawl database, to guide itself towards relevant, valuable resources and away from irrelevant and/or low quality material on the Web. Thereby, the Web crawler builds a comprehensive topic-specific library for the benefit of specific users.

32 Claims, 5 Drawing Sheets

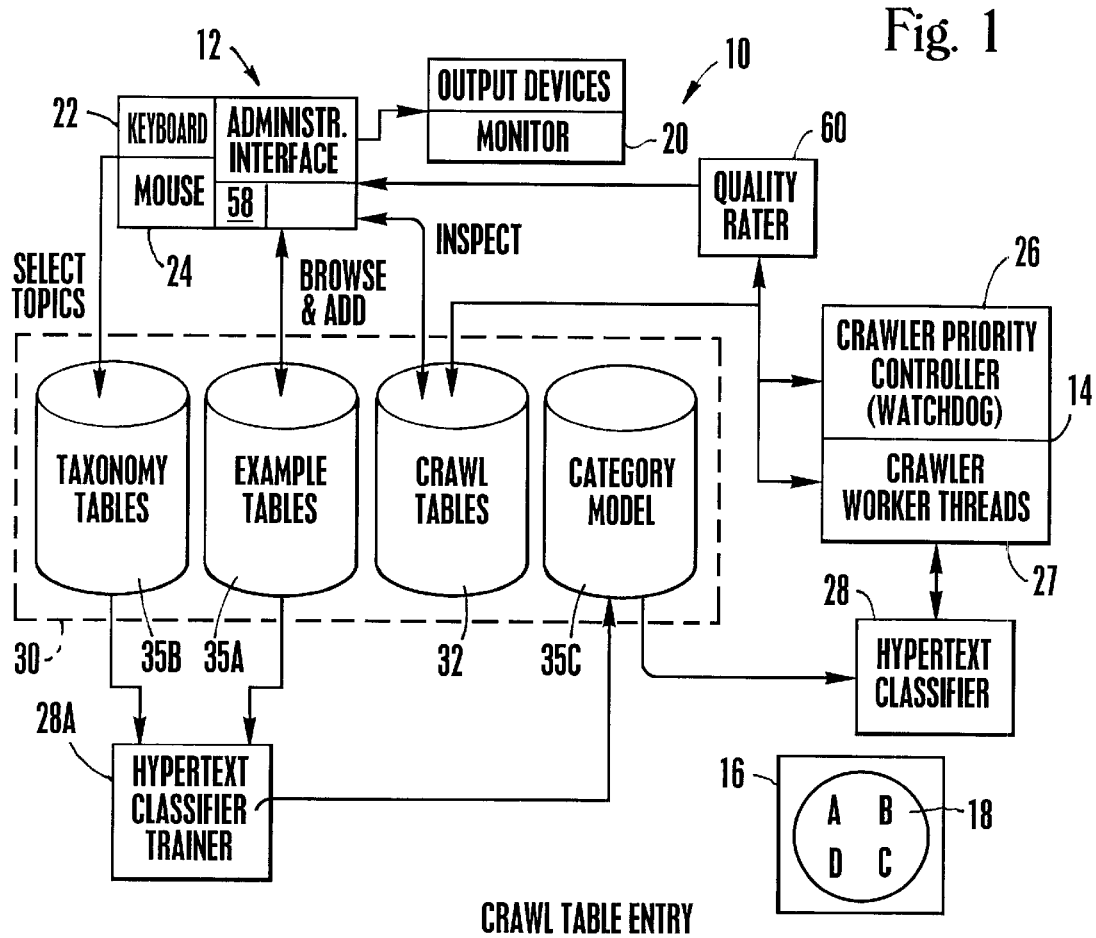

Fig. 1

CRAWL TABLE ENTRY

| FIELD NAME | DATA TYPE | DESCRIPTION |
|---|---|---|
| URL | VARCHAR | URL OF PAGE |
| OID | CHAR(8) | 64-BIT HASH OF URL (PRIMARY KEY) |
| NUM_TRIES | SHORTINT | COUNT HOW MANY TIMES THIS URL HAS BEEN CONSIDERED BY CRAWLER |
| PRIORITY | SHORTINT | CRAWL OR REFRESH PRIORITY SET BY TOPIC ANALYZER |
| IPADDR | INTEGER | IP ADDRESS OF SERVER FROM WHICH PAGE WAS ACQUIRED |
| FOUND | TIMESTAMP | TIME WHEN PAGE WAS FIRST FOUND |
| INDEXED | TIMESTAMP | TIME WHEN PAGE WAS LAST INDEXED |
| MODIFIED | TIMESTAMP | TIME WHEN PAGE WAS LAST MODIFIED |
| RELEVANCE | FLOAT | RELEVANCE OF PAGE |
| CID | SH.INT. | CATEGORY ID |

| FIELD NAME | DATA TYPE | DESCRIPTION |
|---|---|---|
| SRCOID | CHAR(8) | SOURCE OF LINK |
| DSTOID | CHAR(8) | TARGET OF LINK |
| TYPE | SHORTINT | TYPE OF LINK: SUBDIR, CROSS, OTHERSITE, REDIRECT |

(LINK) EDGE TABLE

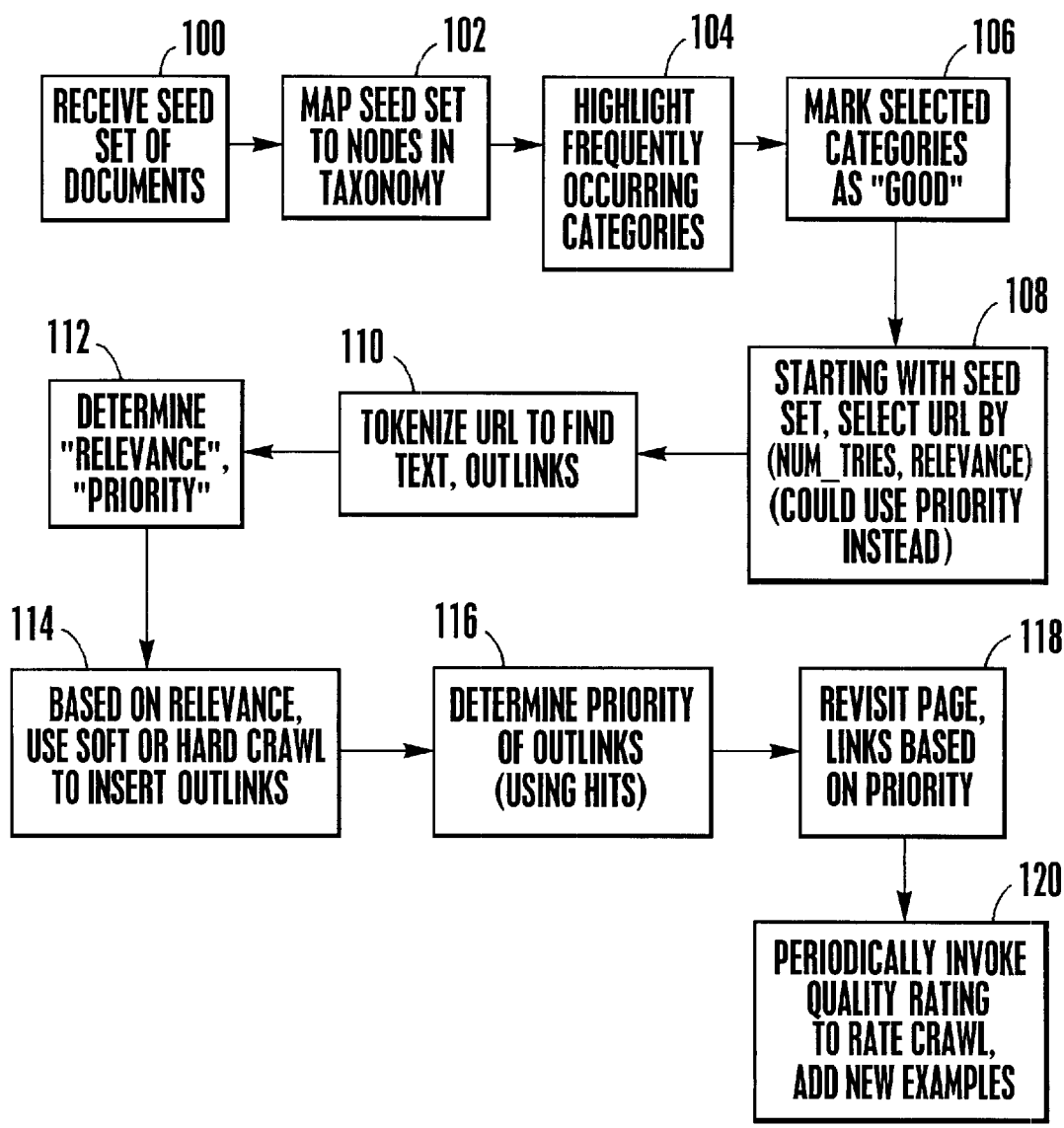

WATCHDOG

WORKER

SYSTEM AND METHOD FOR FOCUSSED WEB CRAWLING

BACKGROUND OF THE INVENTION

1. Field of the Invention

The present invention relates generally to searching wide area computer networks for information, and more particularly to searching the World Wide Web for topical information.

2. Description of the Related Art

The system known as the "World Wide Web", or simply "Web", as implemented by the wide area computer network known as the Internet, contains a vast amount of information in the form of Web pages. Each Web page is electronically stored in a respective Web site on a computer, referred to as a Web server, with the Web itself including many Web servers that are interconnected by means of the Internet. A person can connect a computer to the Internet via, e.g., a telephone line, and thereby electronically access the Web pages on the Web servers.

As the Web has grown, many millions of Web pages have been created. In other words, the Web contains a vast amount of information, and the content of the Web grows and changes minute by minute. It will accordingly be appreciated that some means must be provided for a person to sort through the vast quantities of Web pages to find a particular item of interest.

With the above consideration in mind, most users employ software known as Web browsers when accessing the Web. To search the Web for a particular topic of information, the user causes their Web browser to access a Web site of a centralized search engine that is maintained by a search company. Examples of currently popular search engines are Alta Vista™ and Hotbot™.

Centralized search engines use software referred to as "crawlers" to continuously access Web pages and construct a centralized keyword index. When a person wishes to retrieve information, the person's browser accesses a centralized search engine using a query, for example, "luxury cars". In response, software at the centralized engine accesses its index to retrieve names of Web sites considered by the search engine to be appropriate sources for the sought-after information. The search engine transmits to the browser hyperlinks to the retrieved sites, along with brief summaries of each site, with the browser presenting the information to the user. The user can then select the site or sites they want by causing the browser to access the site or sites.

Owing to the burgeoning of the Web and the ever-growing amount of its information, and the fact that the above-described centralized crawler schemes posture themselves to respond to any possible query (i.e., to be all things to all people), centralized crawler/searchers require large investments in hardware and software and must never cease crawling the Web, to index new pages and to periodically revisit old pages that might have changed. Indeed, one Web search company currently requires the use of 16 of the most powerful computers made by a major computer manufacturer, each computer having 8 gigabytes of memory. Another search company currently uses a cluster of 300 powerful workstations and over one terabyte of memory to crawl over 10 million Web pages per day. Despite these heroic efforts, however, it is estimated that a single search company is able to index only 30%-40% of the Web, owing to the size of the Web which, incidentally, shows no signs of slowing its rate of expansion (currently at about one million new pages per day).

Accordingly, one problem with current technology that is recognized and addressed by the present invention is the need to reduce the vast amount of Web search hardware and software that is inherently required by a centralized search scheme.

Additionally, evaluating whether a particular Web page contains relevant information with respect to a user query is sometimes difficult. Moreover, user queries may not be effectively articulated, or they may be overbroad. Consequently, a Web search engine frequently responds to a query by returning a large number of Web pages that are of little or no interest to the requester. Nonetheless, a user must laboriously sort through hundreds and perhaps thousands of returned Web pages, which, as discussed above, can be considered to represent only 30%-40% of the total Web content in any case. Moreover, because a centralized crawler seeks the capability to respond to any query, most of the index of any single centralized system contains information that is of little or no value to any single user or indeed to any single interrelated group of users.

Thus, two other problems recognized and addressed by the present invention are the lack of focus of search results, and the fact that centralized crawlers are not tailored to any particular user or to any particular interrelated group of users and, thus, contain mostly irrelevant information, from the point of view of a single user or group of users.

In addition to the above considerations, the present invention recognizes that many if not most Web pages refer to other Web pages by means of hyperlinks, which a user can select to move from a referring Web page to a referred-to Web page. The present invention further recognizes that such hyperlinks are more than simply navigation tools; they are important tools for relevant data acquisition as well.

It happens that with the existing Web communication protocol (hypertext transfer protocol, or "http"), when a user clicks on a hyperlink to a referred-to Web page v from a referring Web page u, the user's browser sends the identity of the referring Web page u to the Web server that hosts the referred-to Web page v, and this information can be recorded or logged. Unfortunately, current logs of which Web pages refer to which other Web pages are mostly unused and indeed mostly not enabled by Web site managers, and the logs moreover consume a relatively large amount of electronic data storage space. Also, no standard way exists for a remote user to access and use the information in the logs.

The present invention, however, recognizes the above-noted problem and addresses how to exploit this currently unused but potentially valuable information in the context of resolving the unfocussed, centralized crawling problems noted above.

SUMMARY OF THE INVENTION

The invention is a general purpose computer programmed according to the inventive steps herein to generate a database of Web pages that is focussed on a predefined topic or topics, for subsequent efficient searching of the database by users. The invention can also be embodied as an article of manufacture—a machine component—that is used by a digital processing apparatus and which tangibly embodies a program of instructions that are executable by the digital processing apparatus to generate the focussed database. This invention is realized in a critical machine component that causes a digital processing apparatus to undertake the inventive logic herein.

In accordance with the present invention, the computer includes computer readable code means for receiving a seed set of Web pages in a crawl database, with the seed set being representative of at least one topic. The computer also includes computer readable code means for identifying outlink Web pages from one or more Web pages in the crawl database, and computer readable code means for evaluating the outlink Web pages for relevance to the topic. Further, the computer includes computer readable code means for causing outlinks only of Web pages that are evaluated as being relevant to the topic to be stored in the crawl database, for subsequent evaluation.

In a preferred embodiment, computer readable code means assign a revisitation priority to a Web page, based on the means for evaluating. To embody the code means, at least one "watchdog" module is provided, and the watchdog module periodically determines new and old pages to consider. The new pages are selected from the outlink Web pages, preferably those that have not yet been visited by the present logic, and the old pages are selected from pages in the crawl database. One or more worker modules respond to the watchdog module to access the new and old pages to consider. In one embodiment, in "considering" a page the present logic fetches and analyzes the page. As disclosed in detail below, each Web page is associated with a respective field (referred to in the preferred embodiment as the "Num_Tries" field) that represents the number of times the respective page has been accessed, and the Num_Tries field of a Web page is incremented each time the Web page is considered.

Additionally, the preferred worker module includes means for determining whether a gathering rate of relevant pages is below a "panic" threshold. In one embodiment, the computer includes computer readable code means for considering all outlinks and inlinks of a Web page in the crawl database when the gathering rate is at or below the panic threshold. When the gathering rate is at or below the threshold, the scope of the topic can be increased to an expanded scope.

In another aspect, a computer system for focussed searching of the World Wide Web includes a computer that in turn includes a watchdog module for scheduling worker thread work and at least one worker module for undertaking the work. The work to be undertaken includes adding outlinks of a Web page to a crawl database, but only when the Web page is relevant to a predefined topic or topics. The crawl database is accessible by the computer and is focussed only on the topic such that the system includes no topically comprehensive database of the World Wide Web.

In still another aspect, a computer-implemented method is disclosed for building a focussed database of Web pages. The method includes receiving a search query from a user, and in response to the search query, accessing a crawl database containing only information pertaining to Web pages related to a limited number of predefined topics. A computer program product executing the method steps is also disclosed.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a block diagram of the present system, showing an example Web page table entry and associated link table entry in an exploded relationship to the crawl database;

FIG. 2 is an overall flow chart of the present logic;

DETAILED DESCRIPTION OF THE PREFERRED EMBODIMENTS

Figure 3:
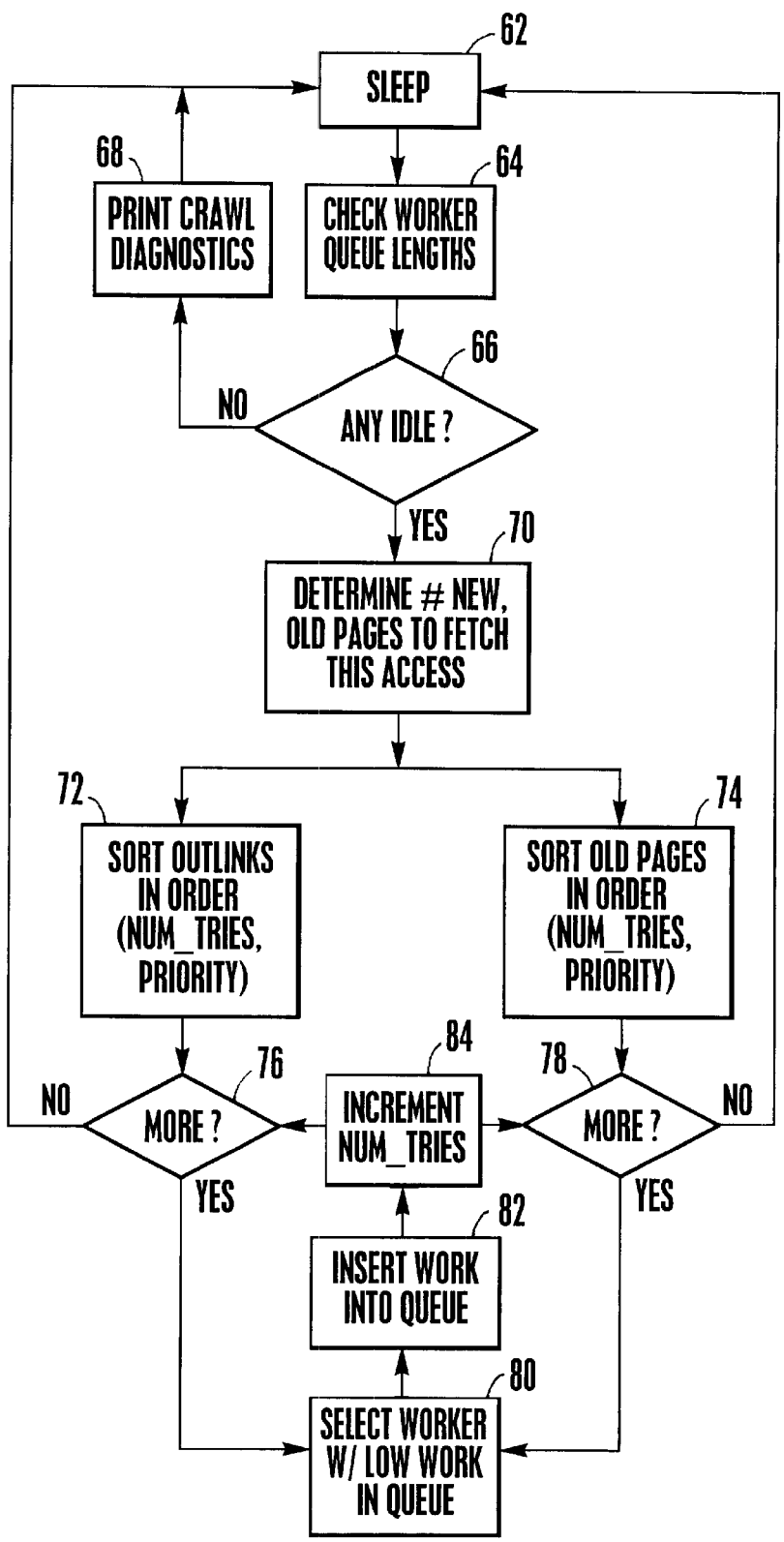
FIG. 3 is a flow chart of the watchdog module logic.

Referring initially to FIG. 1, a system for focussed Web crawling is shown, generally designated 10. In the particular architecture shown, the system 10 includes a digital processing apparatus, such as a computer 12, which accesses the World Wide Web via the Internet 13. In one intended embodiment, the computer 12 may be a personal computer made by International Business Machines Corporation (IBM) of Armonk, N.Y. as shown, or the computer 12 may be any computer, including computers sold under trademarks such as AS400, with accompanying IBM Network Stations. Or, the computer 12 may be a Unix computer, or OS/2 server, or Windows NT server, or IBM RS/6000 250 workstation with 128 MB of main memory running AIX 3.2.5., or an IBM laptop computer.

The computer 12 includes a focussed crawler 14 which may be executed by a processor within the computer 12 as a series of computer-executable instructions. These instructions may reside, for example, in RAM of the computer 12, and may be programmed as a $C^{++}$ ODBC application.

Alternatively, the instructions may be contained on a data storage device with a computer readable medium, such as a computer diskette 16 shown in FIG. 1. As show, the diskette 16 includes a data storage medium 18 holding computer program code elements A-D. Or, the instructions may be stored on a DASD array, magnetic tape, conventional hard disk drive, electronic read-only memory, optical storage device, or other appropriate data storage device. In an illustrative embodiment of the invention, the computer-executable instructions may be lines of compiled $C^{++}$ compatible code. As yet another equivalent alternative, the logic can be embedded in an application specific integrated circuit (ASIC) chip or other electronic circuitry.

FIG. 1 also shows that the system 10 can include peripheral computer equipment known in the art, including an output device such as a video monitor 20 and input devices such as a computer keyboard 22 and mouse 24. Other output devices can be used, such as printers, other computers, and so on. Likewise, input devices other than the keyboard 22 can be used, e.g., trackballs, keypads, touch screens, and voice recognition devices.

As described in detail below, the focussed crawler 14 accesses scheduler controls 26 that control when the focussed crawler 14 executes its logic. Accordingly, the scheduler controls 26 are referred to below as a "watchdog module", and the focussed crawler is from time to time referred to as a "worker thread" or threads 27. Indeed, in the preferred embodiment the watchdog module controls multiple worker threads 27.

Additionally, the focussed crawler 14 accesses a topic analyzer 28 (also referred to herein as "hypertext classifier"). The topic analyzer 28 compares the content of a Web page with a predefined topic or topics and generates a response representative of how relevant the Web page is to the topic. A relevant Web page is referred to as a "good" Web page. Details of one preferred topic analyzer are set forth in co-pending U.S. patent application Ser. No. 09/143,733, filed Aug. 29, 1998, for an invention entitled "Method for Interactively Creating an Information Database Including Preferred Information Elements, such as Preferred-Authority, Worldwide Web Page", owned by the same assignee as is the present invention and incorporated herein by reference. Or, the following references provide topic analyzers: Chakrabarti et al., "Enhanced Hypertext Categorization Using Hyperlinks", SIGMOD ACM, 1998, and Chakrabarti et al., "Scalable Feature Selection, Classification, and Signature Generation for Organizing Large Text Databases into Hierarchical Taxonomies", VLDB Journal, invited paper, August, 1998.

As disclosed below, it is the purpose of the system 10 to generate a database that contains information on only Web pages that pertain to the topic or topics of interest, i.e., a focussed database. This database is depicted in FIG. 1 as a crawl database 30. As shown, the crawl database 30 includes a Web page ("crawl") table 32 that includes corresponding link tables 34 each of which is an edge table relative to the Web page table 32. Also, the database 30 includes example Web page tables 35A and taxonomy tables 35B. A user can search the database 30 efficiently for Web pages of interest, i.e., for only Web pages relating to the topic on which the database 30 is focussed. Advantageously, Web document meta data such as the data in present tables is stored in a relational database, and more preferably in the database referred to as DB2/UDB, made by the present assignee.

As shown in FIG. 1, the Web page table 32 includes plural fields, each having at least a name, a data type, and, for disclosure purposes, a field description. More specifically, the Web page table 32 includes a Uniform Resource Locator (URL) field 36, having a variable character data type, that represents a Web page URL. Also, the Web page table 32 includes various other fields associated with the URL, including an OID field 38 that is an eight character, 64 bit hash of the URL, and a Num_Tries field 40 that is a count of how many times the Web page associated with the URL has been considered by the crawler 14, both as a "new" page and as an "old" page as described below. Furthermore, the Web page table 32 includes a priority field 42 that represents how often the Web page is to be revisited by the crawler 14, as determined in consonance with the topic analyzer 28, to determine whether any changes in the Web page have occurred, and to "refresh" the entry in the Web page table 32 as appropriate therefor.

In addition, the preferred Web page table 32 includes various administrative fields, including an integer IP address field 44 representing the address of the Web server from which the Web page represented by the URL field 36 was acquired. Also, three time stamp fields are provided, namely, a "found" field 46, indicating the date and time when the page was initially found, an "indexed" field 48, indicating the date and time when the page was last indexed in the table 32, and a "modified" field 50, indicating the date and time the Web page was last modified by the provider of the content of the page. Moreover, a relevance filed 51 indicates the relevance of the Web page as more fully disclosed below, and a category id ("cid") field 51A indicates the topic category of the page.

It is to be understood that information pertaining to a "seed" set of Web pages is initially stored in the Web page table 32. The seed set can be gathered from, e.g., the temporary Internet file directories of the employees of a company or from some other group that can be expected to have shared interests and that, consequently, can be expected to have collectively downloaded Web pages that are related to a limited number of predefined topics. Thus, the seed set does not define a comprehensive, universal set of all topics on the Web, but rather a relatively narrow topic or range of topics that are of interest to the particular source (e.g., employee group) from which the seed set is derived or otherwise defined. As but one example, a seed set of Web pages might all be related to the topic "mining". The topic itself can be defined by a user or by considering the seed set using the topic analyzer 28, including an associated classifier trainer 28A, to derive the predefined topic or topics from the seed set in the example tables 35A and from data in the taxonomy tables 35B, but in any case, only Web pages relating to the topic are contained in the database 30. Once derived, the target topic is stored in a category model data structure 35C.

The link table 34 is an edge table (e.g., graph edge) associated with the URL field 36. It includes an eight character source field 52, representing the source of the hyperlink that was followed by the crawler 14 to initially consider the Web page represented by the URL field 36. Such links are referred to as "inlinks", because they lead in to the Web page represented by the URL field 36. Similarly, an eight character target field 54 represents any links to other Web pages contained in the Web page represented by the URL field 36. Such links are referred to as "outlinks" because they lead to Web pages other than the Web page represented by the URL field 36. A "type" field 56 that is a short integer string is also included in the link table 34. The type field 56 indicates the type of outlink in the target field 54, e.g., whether the link is to a subdirectory of the directory in which the URL 36 resides, or in another directory (a "cross directory") in the same server, or on another Web site altogether, or whether the link redirects the user to back to the URL 36.

With the above overall architecture in mind, a user can generate a query for information using the keyboard 22 or mouse 24, and in response a conventional browser or searcher 58 associated with the computer 12 accesses the crawl database 30 to retrieve a list of relevant Web pages therefrom in accordance with well-known principles. It will readily be appreciated that the database 30 does not contain a listing of Web pages unrelated to the predefined topic, but only relevant Web pages. Consequently, the browser 58 will quickly respond to the query when the query is related to the predefined topic; otherwise, for queries unrelated to the topic, no response will be available from the database 30. Under such a circumstance, the browser 58 can access a conventional crawler database. If desired, a conventional quality rating system 60 can evaluate the quality of Web sites in the database 30 for relevancy to a user's query.

FIG. 2 shows the overall logic of the present invention. Starting at state 100, the seed set of example Web pages is received from the user. Moving to block 102, the seed set is mapped to appropriate nodes in the taxonomy by invoking a classification program such as Taper or HyperClass on each document in the seed set. Proceeding to block 104, frequently occurring seed set categories in the taxonomy are highlighted, and these categories are marked or otherwise indicated as being "good" categories at block 106.

Next, at block 108, starting with the seed set the URL of each page is selected based on its Num_Tries field 40 (FIG. 1) and its relevancy field 51. Alternatively, the priority field 42 can be used. Initially, the relevance and priority fields can have default values.

From block 108 the process moves to block 110 to tokenize the URL to identify its textual content and outlinks. Proceeding to block 112, the relevance and priority of the document are determined as follows.

To determine the relevance of a document, it is assumed that the category taxonomy imposes a hierarchical partition of web documents. Categories in the taxonomy tree, also referred to as nodes, are denoted "c". The predicate good(c) denotes whether a node "c" has been marked as good. By definition, for any document "d", the probability that it was generated from the category $c_0$ corresponding to the root node, denoted $Pr[c_0|d]$, is one. In general $Pr[c|d]=Pr[parent(c)|d]Pr[c|d,parent(c)]$. $Pr[parent(c)|d]$ is computer recursively, whereas $Pr[c|d,parent(c)]$ is computed using Bayes Rule as $Pr[c|parent(c)]Pr[d|c/\Sigma_c Pr[c'|parent(c')]Pr[d|c']$, where the sum ranges over all siblings c' of c. Finally, the probability that a page is relevant is $\Sigma_{good(C)}Pr[c|d]$. This quantity, denoted R(d), is typically very small, so the logarithm of R(d) can be stored if desired.

To model the way a document is generated by a category the following Bernoulli document model for text is used. First select a category for the document and pick a length for the document. Notionally associated with each category is a many-sided coin. Each face of the coin represents a word; the probability that the face comes up corresponds with the probability that the corresponding word occurs in a document of this particular category. This coin is repeatedly tossed (figuratively) to write out the document until the length is reached. The category taxonomy is represented in a relational table as follows:
kcid smallint not null primary key,
pcid smallint not null,
kcname varchar(250) not null,
good smallint not null
where kcid is the ID of the current node ("kid" class ID), pcid is the ID of the parent class, kcname is the textual name, and good is a bit set to express whether the node is good for the current focus. The document table has two fields coupling it with the taxonomy table: relevance, which is set to $\log \Sigma_{good(c)}Pr[c|d]$, and cid, which represents the best matching leaf for the class. The priority with which a particular page is revisited can then be directly correlated to its relevance.

Moreover, the priority of a document not only can be determined by determining its relevance, but also by determining its "popularity", a measure of the quality of the document. Based on the recall precision trade-off of the application and the availability of disk and network resources, a suitable threshold $\mu$ on relevance is defined, e.g., 10%-20% Of the pages fetched in the current crawl, only those pages exceeding the threshold are selected as candidate "authorities". Any page pointing to at least one "authority" is a candidate "hub". "Hubs" are not thresholded.

Next, an edge set E is constructed using only those links that are between pages on different sites. Unlike the conventional HITS algorithm, the present invention have weights; edge (u,v) has three associated numbers: the relevance score of "u" called R[u], the number of distinct pages on the same server as "u" that point to "v", called h'[u,v], and the number of distinct pages on the same server as "v" to which "u" points, called a'[u,v]. Iterations of the following form can then be performed using the edge weights R[u]/h'[u,v] while computing a[v] and R[u]/a'[u,v] while computing h[u], with the authority assignment being changed to only consider pages that pass the relevance bar: $R[x]>\rho$: $a[v] \leftarrow \Sigma_{(U,V) \in E} h[u]$ and $h[u] \leftarrow \Sigma_{(U,V) \in E} a[v]$ interspersed with scaling h[ ] and a[ ] to sum to unity.

From block 112 the logic moves to block 114. At block 114 the present logic uses a "soft" or "hard" crawl to insert outlinks into the appropriate portion of the crawl database 30. As recognized by the present invention, during early stages of a focused crawl, when there is ample storage and many pages to fetch, the crawl should be biased away from refreshing or retrying pages and toward seeking new pages. When little progress can be subsequently made because the disks are full or the topic is nearly entirely crawled, the priority should switch in favor of revisiting pages. The priority and relevance fields permit two types of crawl policies, i.e., the above-mentioned "soft" and "hard" crawl policies.

Figure 5:
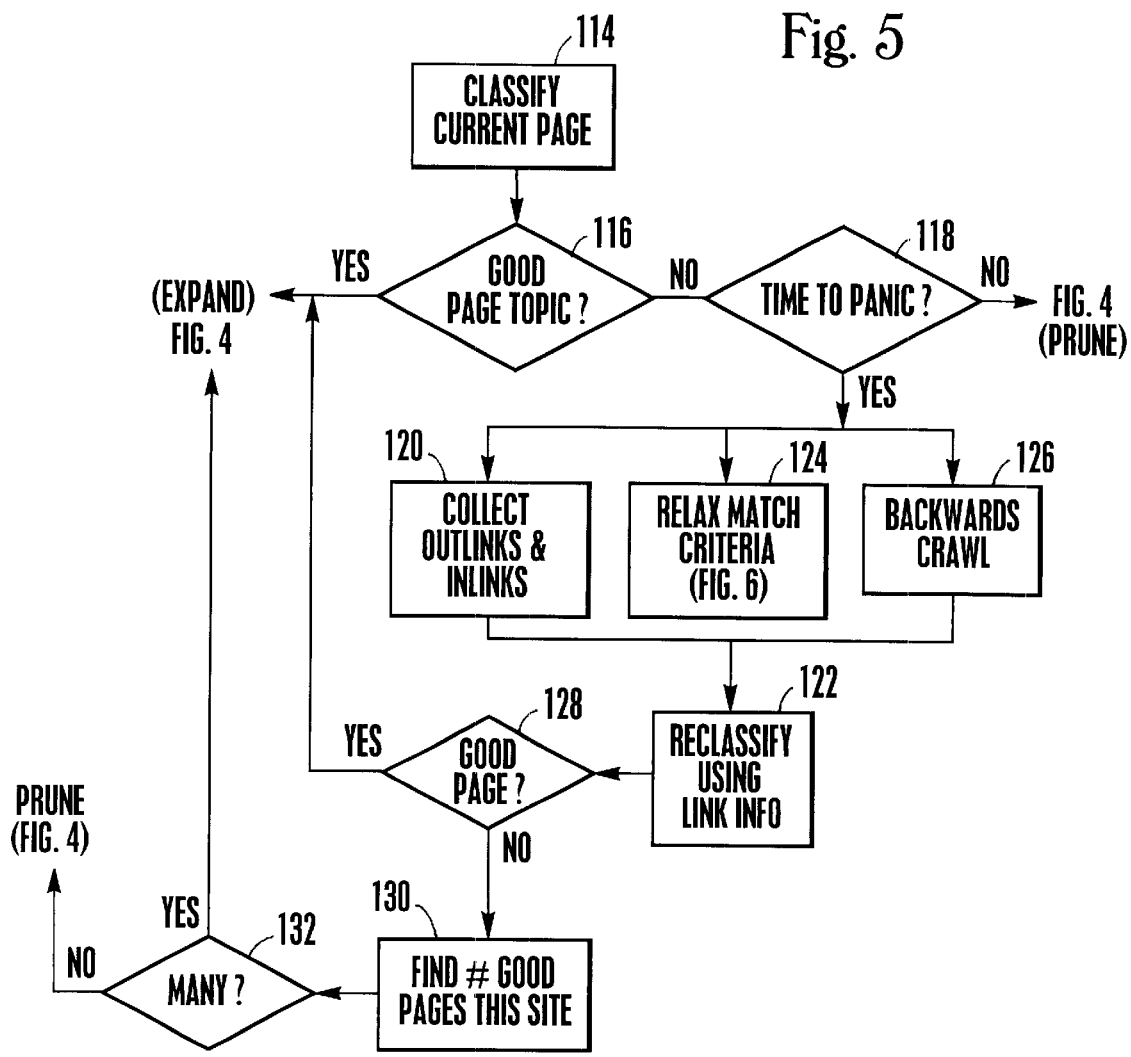
FIG. 5 is a flow chart of the worker module classification logic.

For the "hard" crawl policy, the classifier 28 is invoked as described above on a Web page, and when it returns the best matching category path, the out-links of the page are entered into the crawl database 30 if and only if some node on the best matching category is marked as "good". FIG. 5 shows the details of such a "hard" crawl policy. As recognized herein, however, such a policy can lead to crawl stagnation, preferred solutions to which are addressed in FIGS. 5 and 6.

Alternatively, a "soft" policy can be implemented in which all out-links are entered into the crawl database 30, but their crawl priority is based on the relevance of the current page. A batch of unvisited pages (typically, a few dozen per thread) are selected in lexicographic order of (Num_Tries, relevance desc, priority asc, bytehash), where "asc" means ascending "desc" means descending, and bytehash is a random number to resolve ties without loading any particular server. Each URL from the group is downloaded and classified, which generally leads to a revision of the relevance score. The revised relevance score is also written into the new records created for unvisited out-links.

As recognized herein, however, the above-described "soft" policy can lead to crawl diffusion, i.e., acquiring less and less relevant pages. Human intervention/evaluation can be used to determine whether diffusion is taking place.

Blocks 116-120 are performed asynchronously with the above-described process to update the relevance and/or priority fields mentioned previously. At block 116, the priority of outlinks gathered above is determined using previously described principles or using the above-mentioned HITS algorithm. At block 118, pages and links are revisited at a frequency based on their priority. Moving to block 120, quality rating is periodically invoked using the quality rater 60 (FIG. 1) to rate the crawl and, if desired, add new example pages to the seed set.

Figure 4:
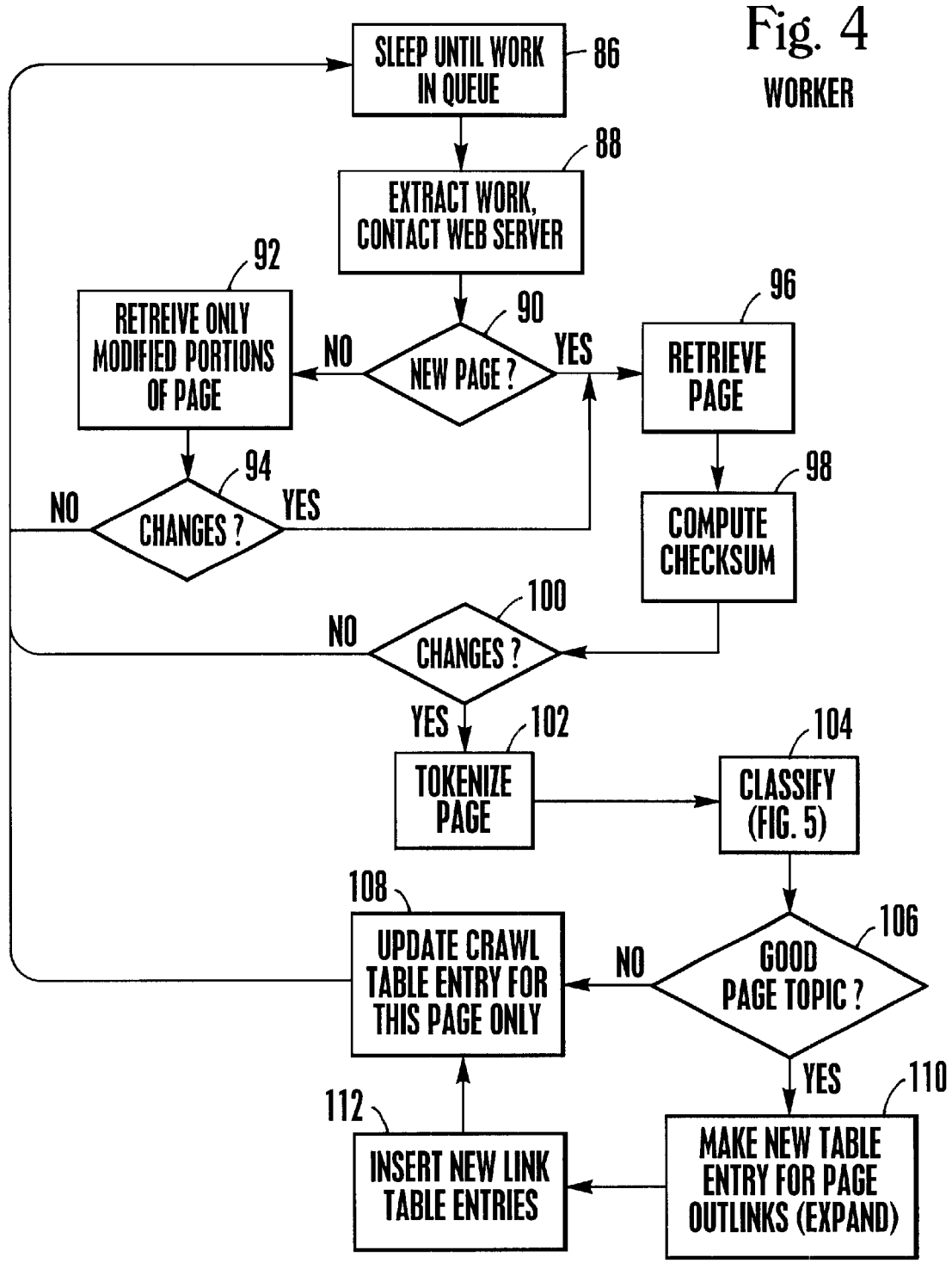
FIG. 4 is a flow chart of a worker module logic.

FIGS. 3 and 4 show a particular implementation of the overall logic shown in FIG. 2. Commencing at block 62, the logic sleeps and periodically awakens to check the lengths of the work queues in the worker threads. At decision diamond 66 it is determined, based on the queue lengths, whether any worker threads are idle or near-idle, and if not, the process prints crawl diagnostic information at block 68, and then loops back to the sleep state at block 62.

On the other hand, when a worker thread is idle or near-idle, the logic moves to block 70 to determine how many new Web pages (that is, pages associated with outlinks in the link table 34) to evaluate and how many old Web pages (that is, pages already listed by URL in the Web page table 32) to evaluate for potential changes to the old pages that might have occurred since the last time the old pages were considered by the system 10. The numbers of new and old pages generated at block 70 depends on, e.g., the amount of old pages already listed in the crawl database 30. For example, if the database 30 is relatively full, more old pages will be checked for changes than new pages considered, whereas when the crawl database is relatively empty, more new pages will be evaluated than old pages checked for changes.

The logic then moves in parallel to blocks 72 (for new pages) and 74 (for old pages). At block 72, the logic sorts the outlinks in the link table 34 in order of the respective Num_Tries fields in the associated source Web page entries in the Web page table 32, with entries having the same value of Num_Tries then being sorted in order their respective priority fields. Likewise, at block 74 old pages are sorted in order of the respective Num_Tries fields in the Web page table 32, with entries having the same value of Num—Tries then being sorted in order their respective priority fields. The top "n" old pages and top "m" new pages are then selected in order from the sorted lists for insertion into worker thread queues as described below.

Moving from block 72 to decision diamond 76, it is determined whether more new pages exist for evaluation in this cycle. If all new pages listed for consideration (evaluation) have been considered (generally after several iterations), the process loops back to the sleep state at block 62. Similarly, moving from block 74 to decision diamond 78, it is determined whether more old pages exist for evaluation in this cycle. If all old pages listed for consideration have been considered, the process loops back to the sleep state at block 62.

On the other hand, when it is determined at decision diamonds 76/78 that more new/old pages must be considered (as will happen for at least the first iteration per cycle through FIG. 3), the process moves to block 80 to select a worker thread with a relatively low workload. At block 82 the work (i.e., the task to check an old page for changes or evaluate a new page for relevancy) is inserted into the queue of the worker thread selected at block 80. Proceeding to block 84 the Num_Tries entry for the assigned page, if an old page, is incremented. For a new page, a Num_Tries entry is provisionally set to unity, pending evaluation of the page for relevancy as discussed below. The logic then proceeds to decision diamonds 76 and 78 to determine whether more pages require processing.

FIG. 4 shows the logic of a worker thread in considering pages assigned to it from the watchdog module. From a sleep state at block 86 the worker thread awakens when work is inserted into its queue to extract the work at block 88. Also at block 88, using communication protocols known in the art the worker thread contacts the Web server that is associated with the page inserted at block 88.

Moving to decision diamond 90 the worker thread determines whether the assigned page is a new page or an old page. If the page is an old page the logic moves to block 92 to retrieve only the modified portions, if any, of the page, i.e., the portions that the associated Web server indicates have changed since the last time the page was considered by the system 10. Accordingly, at decision diamond 94 it is determined by the system 10 whether in fact the old page has been changed as reported by the associated Web server, and if the page has not been changed, the process loops back to the sleep state at block 86.

In contrast, if the page is an old page that has been determined to have changed at decision diamond 94, or if the page is determined to be a new page at decision diamond 90, the logic moves to block 96 to retrieve the entire page from the associated Web server. At block 98, a checksum representative of the page's content is computed, and this checksum establishes the OID field 38 (FIG. 1) of the associated entry in the Web page table 32.

Moving to decision diamond 100, when the page under test is an old page the checksum computed at block 98 is compared against the previous value in the associated OID field 38 to again determine, at a relatively fine level of granularity, whether any changes have occurred. If the checksum comparison indicates that no changes have occurred, the process loops back to sleep at block 86.

If the checksum comparison at decision diamond 100 indicates that new data is being considered, however, the logic proceeds to block 102 to tokenize the Web page, that is, to separate from each other and, e.g., alphabetize or otherwise categorize the various terms in the Web page in accordance with means known in the art, to facilitate subsequent evaluation of the page. Then, the page is classified at block 104 using the topic analyzer or classifier 28, and at decision diamond 106 it is determined whether the page is "good" in terms of relevancy to the predefined topics established by the seed set of Web pages mentioned previously, also using the topic analyzer 28. Further details of the process shown at steps 104 and 106 are discussed below in reference to FIG. 5.

When the process determines that the page under test is not relevant to the predefined topic, the process moves to block 108 to update the Web page table 32 entries for the page under test (if the page is an old page), and then to return to block 86. It is to be understood that only the page under test is recorded at block 108, and that the outlinks of the page under test are not entered into the link table 34. Also, if the page under test is a new but irrelevant page, it is not added to the page table 32 at block 108. Thus, from one aspect, the page under test is pruned at block 108, in that its outlinks are not stored by the system 10 and the page itself is not stored if the page is a new but irrelevant page. One of the entries that is updated is the revisitation priority field 42 in the Web page table 32, which is undertaken based on the relevancy evaluation by the topic analyzer 28. The more relevant the page, the higher the priority for revisitation to check for subsequent changes.

If the page under test is determined to be relevant to the topic, however, the process moves to block 110, wherein entries are generated for the link table 34 for all outlinks of the page. In other words, the page is expanded in that its outlinks are recorded at block 110. These entries are inserted into the link table at block 112, and then the process updates the Web page table 32 entries for the page under test at block 108. It is to be understood that if the page under test is a new page, new table 32 entries are made.

Further details of the page processing logic is shown in FIG. 5. Commencing at block 114, the current page is classified relative to its topics, using the topic analyzer 28 (FIG. 1), and then the page is evaluated for relevancy to the predefined topic at decision diamond 116. The logic at steps 114 and 116 has been previously shown at steps 104 and 106 in FIG. 4. As explained previously, when the page is a "good" page the logic expands the outlinks of the page at block 110 of FIG. 4. When the page is not a good page, the logic prunes the page at block 108 of FIG. 4, but FIG. 5 shows that prior to pruning, in the preferred embodiment the logic moves to decision diamond 118 to determine whether the rate of gathering pages is below a panic threshold. If desired, the test can compare the rate of gathering only relevant new pages to a threshold. Other tests for determining whether to enter a "panic" mode can be used. When the gathering rate is not below the threshold, the logic prunes the page as described in FIG. 4. Otherwise, the logic determines that it is in a "panic" situation, in that its processing is not resulting in the addition of many or any new pages to the crawl database 30.

When the logic is in the "panic" mode, the logic attempts to increase the scope of the search. One method to do this envisioned by the present invention is shown at block 120, wherein all outlinks and inlinks to the page under test are collected. Moving to block 122, the topic of the page under test is broadened to also include any additional topics that might be contained in inlinks and outlinks to the page under test.

Alternatively, the logic can move to block 124 to relax the matching criteria, i.e., to broaden the definition of "relevancy" used by the topic analyzer 28. Further details of the process shown at block 124 are described below in reference to FIG. 6. As yet another alternative, the logic can move to block 126 of FIG. 5 to undertake a "backwards crawl", i.e., to query the Web server associated with the Web page under test for sibling links to the page under test, and then to proceed to block 122 as described. "Sibling links" are links to other Web pages that are pointed to from an inlink of the page under test.

From block 122 the logic moves to decision diamond 128 to once again determine whether the page is "good" in terms of relevancy, using the expansions at blocks 120, 124, 126 as appropriate. If the page is good, the logic expands the page as described above in FIG. 4. Otherwise, the logic moves to block 130 to find the number of good pages that have been found at the Web site of the Web page under test, and at decision diamond 132 it is determined whether many (e.g., ⅔ of site pages tested) of the pages at the site have been evaluated as being "good". If the test is positive at decision diamond 132, the logic moves FIG. 4 to "expand" the page as described; otherwise, the logic moves to FIG. 4 to prune the page under test.

Figure 6:
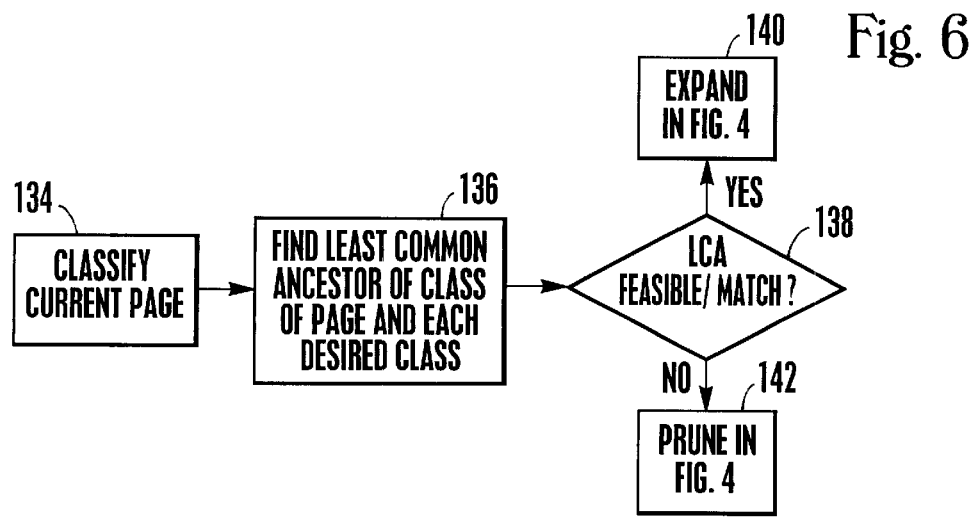
FIG. 6 is a flow chart of the logic for relaxing match criteria to recover from the panic mode.

FIG. 6 shows the details of relaxing the match criteria step at block 124 of FIG. 5. At block 134 in FIG. 6 the page under test is classified as described, and then at block 136 the least common ancestor of the page classification with respect to the desired classification (i.e., predefined topic) is found. For example, suppose the desired topic is "database mining" and the page under test includes a classification "database generation". The least common ancestor (LCA) topic contained in the page under test in this example is "database".

Moving to decision diamond 138, it is determined whether it is feasible to consider Web pages as being "good" if they match the LCA. That is, at decision diamond 138 it is determined whether relaxing, (i.e., expanding, the topic definition against which Web pages are tested) would result in an excessively high number of pages being classified as "good" and, thus, would result in a loss of focus in the database 30. The currently preferred way to make this determination is to estimate a size of the set of Web pages satisfying the expanded topic definition, and then relaxing the topic definition when the estimated size is at or below a size threshold. This estimating can be done by undertaking a search on the LCA using a conventional comprehensive search engine such as Yahoo® and comparing the number of returned documents to a threshold. The threshold itself can vary depending on the processing power of the system 10 and the time available to build the database 30. When the decision at diamond 138 is positive and the Web page classification is sufficiently close to the LCA, the Web page is expanded at block 140; otherwise, it is pruned at block 142.

While the particular SYSTEM AND METHOD FOR FOCUSSED WEB CRAWLING as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

We claim:

1. A general purpose computer including a data storage device including a computer usable medium having computer readable code means for focussed crawling of a wide area computer network such as the World Wide Web, comprising:

computer readable code means for receiving a seed set of Web pages in a crawl database, the seed set being selected based at least on relevance to at least one topic;

computer readable code means for identifying outlink Web pages from one or more Web pages in the crawl database;

computer readable code means for evaluating one or more outlink Web pages for relevance to the topic; and computer readable code means for causing outlinks only of Web pages evaluated as being relevant to the topic to be stored in the crawl database.

2. The computer of claim 1, further comprising:

computer readable code means for assigning a revisitation priority to a Web page, based on the means for evaluating.

3. The computer of claim 1, further comprising:

at least one watchdog module periodically determining new and old pages to consider, the new pages being selected from the outlink Web pages, the old pages being selected from pages in the crawl database; and one or more worker modules responsive to the watchdog module for accessing the new and old pages to consider, each Web page being associated with a respective Num__Tries field representing the number of times the respective page has been accessed, the Num__Tries field of a Web page being incremented each time the Web page is considered.

4. The computer of claim 1, further comprising one or more worker modules for accessing new and old pages to consider, each Web page being associated with a respective field representing the number of times the respective page has been accessed, the field of a Web page being incremented each time the Web page is considered, wherein outlinks of a Web page considered by the worker module are entered into a link table in the crawl database only when the means for evaluating determines that the Web page is relevant.

5. The computer of claim 4, wherein the worker module includes means for determining whether a gathering rate of pages is considered is below a panic threshold.

6. The computer of claim 5, wherein the computer includes computer readable code means for considering all outlinks and inlinks of at least one Web page in the crawl database when the gathering rate is at or below the panic threshold.

7. The computer of claim 5, wherein the topic defines a scope, and the scope is increased to an expanded scope when the gathering rate is at or below the threshold.

8. The computer of claim 7, further comprising computer readable code means for estimating a size of a prospective Web page consideration step based on the expanded scope, and permitting the prospective consideration step only when the size is at or below a size threshold.

9. A computer system for focussed searching of the World Wide Web, comprising:

a computer including at least one worker module for undertaking work, the work including adding outlinks of a Web page to a crawl database only when the Web page is relevant to a predefined topic, the system including the crawl database, the crawl database being accessible by the computer, the crawl database being focussed only on the topic such that the system includes no comprehensive database of the World Wide Web.

10. The computer system of claim 9, comprising:
means executable by the computer for receiving into the crawl database a seed set of Web pages, the seed set being representative of at least the topic;
means in the worker module for identifying outlink Web pages from one or more Web pages in the crawl database;
means in the worker module for evaluating one or more outlink Web pages for relevance to the topic; and
means in the worker module for causing outlinks of Web pages to be stored in the crawl database in response to the means for evaluating.

11. The computer system of claim 10, further comprising:
means for assigning a revisitation priority to a Web page, based on the means for evaluating.

12. The computer of claim 10, further comprising a watchdog module for scheduling worker thread work, wherein the watchdog module periodically determines new and old pages to consider, the new pages being selected from the outlink Web pages, the old pages being selected from pages in the crawl database, the worker module being responsive to the watchdog module for accessing the new and old pages to consider, each Web page being associated with a respective field representing the number of times the respective page has been accessed, the field of a Web page being incremented each time the Web page is considered.

13. The computer of claim 12, wherein outlinks of a Web page considered by the worker module are entered into a link table in the crawl database only when the means for evaluating determines that the Web page is relevant.

14. The computer of claim 12, wherein the worker module includes means for determining whether a gathering rate of pages is considered is below a panic threshold.

15. The computer of claim 14, wherein the worker module includes means for considering all outlinks and inlinks of at least one Web page in the crawl database when the gathering rate is at or below the panic threshold.

16. The computer of claim 14, wherein the topic defines a scope, and the scope is increased to an expanded scope when the gathering rate is at or below the threshold.

17. The computer of claim 16, wherein the worker module further comprises means for estimating a size of a prospective Web page consideration step based on the expanded scope, and permitting the prospective consideration step only when the size is at or below a size threshold.

18. A computer-implemented method for building a focussed database of Web pages, comprising the acts of:
receiving a search query from a user;
in response to the search query, accessing a crawl database containing only information pertaining to Web pages related to a predefined range of topics;
periodically determining new and old pages to consider, the new pages being selected from outlink Web pages, the old pages being selected from pages in the crawl database; and
accessing the new and old pages to consider, each Web page being associated with a respective field representing the number of times the respective page has been accessed, the field of a Web page being incremented each time the Web page is considered.

19. The method of claim 18, further comprising:
initially receiving a seed set of Web pages in the crawl database, the seed set defining the range of topics;
evaluating one or more Web pages in the database for relevance to the range of topics;
identifying outlink Web pages from one or more Web pages in the crawl database in response to the evaluating step;
evaluating one or more outlink Web pages for relevance to the range of topics; and
causing outlinks only of Web pages evaluated as being relevant to the topics to be stored in the crawl database.

20. The method of claim 18, wherein outlinks of a Web page are entered into a link table in the crawl database only when the Web page is relevant.

21. The method of claim 18, further including determining whether a gathering rate of pages is considered to be below a panic threshold.

22. The method of claim 21, further comprising considering all outlinks and inlinks of at least one Web page in the crawl database when the gathering rate is at or below the panic threshold.

23. The method of claim 21, wherein the topic defines a scope, and the scope is increased to an expanded scope when the gathering rate is at or below the threshold.

24. The method of claim 23, further comprising estimating a size of a prospective Web page consideration step based on the expanded scope, and permitting the prospective consideration step only when the size is at or below a size threshold.

25. A computer program device comprising:
a computer program storage device readable by a digital processing apparatus; and
a program means on the program storage device and including instructions executable by the digital processing apparatus for performing method steps for focussed Web crawling, the method steps comprising the acts of:
receiving a search query from a user;
in response to the search query, accessing a crawl database containing only information pertaining to Web pages related to a predefined topic or topics; and
determining whether a gathering rate of pages is considered to be below a panic threshold.

26. The computer program device of claim 25, wherein the acts further comprise:
initially receiving a seed set of Web pages in the crawl database, the seed set defining the topic;
identifying outlink Web pages from one or more Web pages in the crawl database;
evaluating one or more outlink Web pages for relevance to the topic; and
causing outlinks only of Web pages evaluated as being relevant to the topic to be stored in the crawl database.

27. The computer program device of claim 26, wherein the acts further comprise:
periodically determining new and old pages to consider, the new pages being selected from the outlink Web pages, the old pages being selected from pages in the crawl database; and accessing the new and old pages to consider, each Web page being associated with a respective field representing the number of times the respective page has been accessed, the field of a Web page being incremented each time the Web page is considered.

28. The computer program device of claim 26, wherein outlinks of a Web page are entered into a link table in the crawl database only when the Web page is relevant.

29. The computer program device of claim 25, wherein the acts further comprise considering all outlinks and inlinks of at least one Web page in the crawl database when the gathering rate is at or below the panic threshold.

30. The computer program device of claim 25, wherein the topic defines a scope, and the scope is increased to an expanded scope when the gathering rate is at or below the threshold.

31. The computer program device of claim 30, wherein the acts further comprise estimating a size of a prospective Web page consideration step based on the expanded scope, and permitting the prospective consideration step only when the size is at or below a size threshold.

32. A computer-implemented method for establishing a database of Web pages based on the relevance of the pages to at least one predefined topic, comprising the acts of:

providing at least one example Web page;

determining the relevance of at least one Web page based at least partially on the example Web page; and at least in part using the relevance of the Web page, determining whether to insert outlinks of the page into the database, wherein the act of determining whether to insert outlinks of the page into the database is undertaken using either a "soft" policy or a "hard" policy.

* * * * *